April 15, 1958    M. H. ALLDREDGE ET AL    2,830,833
JOINT ASSEMBLY
Filed July 17, 1953
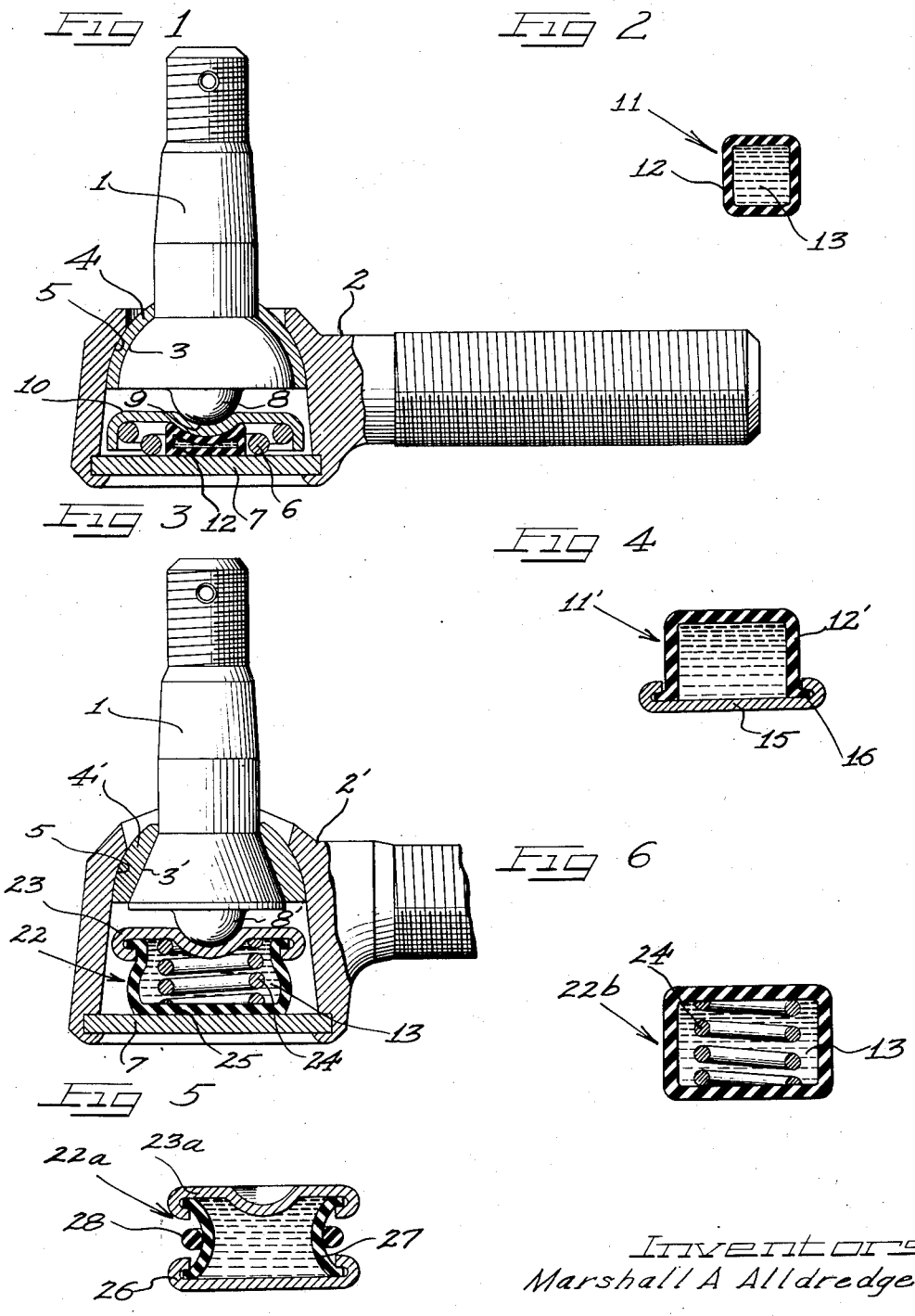
Inventors
Marshall A Alldredge
Donald P. Marquis
By *Hill, Sherman, Meroni, Gross & Simpson* Attys United States Patent Office 2,830,833
Patented Apr. 15, 1958

2,830,833
JOINT ASSEMBLY

Marshall H. Alldredge, Detroit, and Donald P. Marquis, Ferndale, Mich., assignors to Thompson Products Inc., Cleveland, Ohio, a corporation of Ohio Application July 17, 1953, Serial No. 368,670

9 Claims. (Cl. 287—90)

The present invention relates to the construction of ball joints, and more particularly is concerned with an improved mechanism for maintaining the component parts of a ball joint in proper contacting relationship.

Ball joints have, of course, been utilized for many years, both in the automotive field and in general industry. One of the greatest uses of the joints of this type has been in the steering linkage as of automobiles. These linkages require that the drag link and tie rod associated with the dirigible wheels of the vehicle be universally pivoted relative to one another in a relatively frictionless yet extremely rugged manner. Due to the fact that modern automobiles are capable of performance at tremendously high speeds, thereby imparting tremendous impact loads to the running gear, it is absolutely necessary in the vital linkages utilized in steering, that the parts have a maximum degree of safety factor and further that no looseness exists.

It has been found in the prior art that the problem of looseness of the ball joint parts under impact loads is very severe. In the prior art constructions the usual technique of maintaining the ball joint stud and ball against their mating surfaces was by positioning a heavy duty spring between the ball joint stud and a portion of the housing. This arrangement has proved satisfactory in the normal automotive usage, such as for example when the automobile is in operation in cities and on good roads where no excessive vibration appears in the steering linkage at ordinary speeds. Nevertheless very serious difficulties have been encountered at high speeds and on poor roads, such as encountered in country driving. Under severe impact there is a definite tendency of the ball joint spring to have a rebound action, during which the ball joint bearing surfaces are disassociated from each other. In this situation there is a feeling of looseness in the steering system which causes the driver to lose confidence in his control. Further, the rebounding of the parts causes a definitely noticeable noise as well as an increase in wear of the parts due to the impact.

It is therefore an object of the present invention to provide a novel ball joint which contains means for preventing separation of bearing surfaces under impact loads.

Another object of the present invention is to provide a ball joint in which the bearing surfaces are maintained in constant bearing relation by a resilient capsule containing material which is not readily deformable under impact loads.

Yet another object of the present invention is to provide a ball joint in which the bearing surfaces are prevented from separation from one another yet which are automatically adjustable to take up wear.

A further object of the present invention is to provide a ball joint which automatically adjusts to remove all looseness between the ball and the ball socket.

A feature of the present invention is a resilient, yieldable sealed container in which a slowly deformable but impact-rigid material is maintained in position against a ball stud to control its position.

Still another feature of the present invention is a sealed container having a silicone polymer therein for cooperation with the parts of the wall stud to prevent separation of the bearing surfaces under impact roads.

Still other objects and features of the present invention will at once become apparent to those skilled in the art from a consideration of the attached sheet of drawings in which several modifications of the present invention are shown by way of illustration only.

On the drawings:

Figure 1 is an elevational view in partial cross section of one embodiment of the invention;

Figure 2 is an enlarged view in cross section of the fluid reservoir shown in Figure 1 in its unstressed condition;

Figure 3 is an elevational view in partial cross section of a second form of ball joint constructed according to the present invention and utilizing a modified form of fluid capsule;

Figure 4 is a detailed view in cross section of a further modification of the fluid capsule utilized in our invention;

Figure 5 is a sectional view of another modified form of fluid capsule constructed according to the present invention; and Figure 6 is a sectional view of yet a further modification of the fluid capsule of the present invention.

As shown on the drawings:

As may be seen in Figure 1, a ball stud 1 is universally mounted within the ball joint housing 2. The stud 1 and the housing 2 are connected to conventional steering linkages, not shown, in the manner well known in the arts.

The universal bearing between the stud 1 and the housing 2 is provided by the segmental spherical surfaces 3 on the ball joint 1, the floating bearing 4 and the inwardly facing segmental spherical surface 5 in the housing 2. The bearing surfaces 3, 4 and 5 are maintained in engagement with one another by means of a relatively strong spring 6 which is seated against the housing closure plate 7. The ball stud 1 is provided with a small diameter semi-spherical pivot 8 which is seated in a depression 9 of the pressure plate 10 which is in turn acted upon by the spring 6.

The parts as thus described will operate satisfactorily at low speeds and over smooth roads in the manner of prior art ball joints. However, in order to prevent separation of the bearing surfaces of the joint under rough road conditions the present invention provides a sealed fluid means at 11 which will positively prevent undesirable looseness.

The capsule or container 11 as shown in the modification shown in Figures 1 and 2, comprises a completely sealed resilient casing 12, which is preferably cylindrical in shape. Within the casing 12 a fluid 13 is provided for controlling the deformation of the casing.

The fluid 13 may be one of a number of fluids which have the characteristic of substantial rigidity under a sharp impact load but will deform readily under gradually applied forces. A fluid that has proved satisfactory, for example, is the silicone polymer of the type generally known as "bouncing putty" described in the patent to Bazley, Patent No. 2,460,116. The silicone oils are also satisfactory in this use although their resistance to sudden deformation is slightly less than those of the bouncing putty polymer. While these silicone fluids have proved very satisfactory, it is to be understood that various other synthetic materials having the same characteristics of high resistance to sudden deformation yet gradual fluidity, may be utilized satisfactorily in the ball joint of the present invention.

The casing 12, as shown, comprises a generally cylindrical bag of resilient material, which may be natural rubber or the synthetic rubbers now commercially available. This material is of the class generally considered yieldable but not compressible. In its free shape, with no stresses applied to it, it takes the form shown in Figure 2. However, after assembly in a ball joint, with the parts in operating position, the capsule 11 takes the form shown in Figure 1. In this position, the capsule has become axially shortened and radially outwardly deformed. This deformation of the resilient casing 12 is resisted by the resilient material 12 which tends to reform into its unloaded state shown in Figure 2. Thus there is a slight resilient tendency of the capsule to maintain itself lightly against the cup 9 of the pressure plate 10 and the closure plate 7.

In operation, with the parts assembled with the position as shown in Figure 1, the stud 1 and the housing 2 are maintained in their universally mounted relation by the spring 6 acting upon the pressure plate 10. Since the casing 12 continually attempts to reform itself into the shape shown in Figure 2 it, with its fluid 13, is in constant contact with the pressure plate 10. As impact loads are exerted against the stud 1 or the housing 2 tending to force the stud 1 downwardly as shown in Figure 1, the pressure plate 10 is acted upon by movement of the stud. However, when the loads are of an impact nature, the fluid 13 acts as a substantially rigid backing member and movement of the pressure plate 10 downwardly is prevented. Of course, however, movement of the stud 1 relative to the housing 2 to take up wear as a result of continued use, is permitted by the capsule 11 which will readily deform under gradually applied loads, and which will also gradually expand as needed to take up for wear in the bearing surfaces 3, 4 and 5.

While the capsule 11 shown in Figures 1 and 2 is shown as having an integral sealed housing 12, it may be desirable for purposes of decreasing manufacturing costs to utilize a capsule 11' as shown in Figure 4. In this figure, the casing 12' is contructed of resilient material as in the casing 12 but is provided with a closure plate 15 which is crimped around the edge 16 of the casing 12'. In utilizing a capsule of the type as shown in Figure 4 the metal closure plate 15 is placed against the housing closure plate 7 with the top, resilient, surface of the casing 12' acting against the pressure plate 10 in the manner shown in Figure 1.

Another modified form of the present invention as shown in Figure 3, wherein the stud 1' and housing 2' are shown. While the stud 1' and the bearings 3', 4' and 5 can of course be constructed substantially identical to those shown in Figure 1, they are, in Figure 3, shown as being of the combined frusto-conical and spherical type. Thus, the bearing surface 3' is frusto-conical to cooperate with the internal frusto-conical surface in the bearing 4', while the outer bearing surface of the bearing 4' and the inner surface 5 of the housing 2 are segmental spherical as in the case of Figure 1. These bearing surfaces permit universal swiveling movement between the ball stud 1' and the housing 2'.

In place of the capsule of the type as shown in Figures 1, 2 and 4, however, a capsule 22 is utilized. This capsule has a metal closing plate 23 which also acts as a pressure plate against the stud pivot 8'. A spring 24 is positioned in the fluid 13 between the pressure plate 23 and the resilient casing 25.

The structure shown in Figure 3 operates in a manner substantially identical to that shown in Figure 1, except that the capsule 22 is constantly maintained in tight relation to the pivot 8 by means of a relatively heavy spring 24 rather than depending upon the tendency of the deformed casing 25 to assume its original shape. The spring 24 also acts in the same manner as the spring 6 in the construction shown in Figure 1 to maintain the bearings 3', 4' and 5 in tight relationship to one another. Thus the arrangement shown in Figure 3 eliminates the need for a separate pressure plate, while at the same time providing the manufacturing advantages of a metallic closure plate 23 as discussed relative to the modification shown in Figure 4.

Further modifications are shown in Figures 5 and 6, wherein capsules 22a and 22b are shown. The capsule 22a is formed of a pair of closure plates 23a and 26 which close the ends of the tubular casing element 27. A resilient ring 28 is stretched around the periphery of the casing 27 and tends to constrict it. Thus, forces tending to shorten the capsule or to urge the plates 22a and 26 together, are forced to expand the ring 28 since displacement of the fluid 13 will cause a radial displacement of the resilient tube 27. Thus the ring 28 acts as a spring tending to force the closure plates 23a and 26 apart into tight relationship with the pivot 8' and the closure plate 7.

In Figure 6 a modification is shown in which the spring 24 and fluid 13 are confined within an integral, sealed casing capsule 22b. This construction is similar to that shown in Figure 2 except that the spring 6 utilized outside the capsule 11 of Figure 2 is positioned within the capsule, thereby tending positively to maintain the capsule in tight engagement with the pivot 8 or 8' of the studs of Figure 1 or 2.

The completely sealed fluid filled capsules 11, 11', 22, 22a, 22b above discussed have proved extremely effective in controlling separation of the bearing elements in a ball stud utilized with linkages subject to severe vibration. In these installations wear which normally results from impact forces, as well as the undesirable noise and feeling of sloppiness, has been eliminated by the joint of the present invention. A further advantage of the present construction in which the bearing surfaces are maintained in constant contact with one another is the fact that the joint will retain grease under pressure with much greater efficiency than joints of the prior art. Thus, when the housing 2 or 2' is filled with grease, which does not affect the synthetic rubber material of the various capsules, the grease will be prevented from leaking out past the bearing surfaces 3, 4 and 5.

It will thus be seen that we have provided a novel ball joint and improved sealed impact shock resisting means which substantially eliminates difficulties found in the prior art ball joints. It is of course understood that modification and variations may be made in the structure herein disclosed without departing from the novel concepts of the present invention.

We claim as our invention:

1. In a ball joint, a housing, a stud positioned for universal pivotal movement within said housing and having bearing surfaces thereon for cooperation with bearing surfaces on said housing, and abutment means positioned between said stud and housing for preventing unseating of said bearing surfaces under sharp impact loads said means comprising a sealed flexible-walled capsule filled with material having substantial rigidity under impact and fluidity under gradually applied forces.

2. In a ball joint comprising a hollow housing having a ball stud positioned therein for universal pivotal movement relative thereto, biasing means forcing said stud into intimate bearing contact with bearing surfaces on said housing, and sealed impact resisting means associated with said stud and said housing for preventing separation of said stud from said housing under impact loads, said impact resisting means comprising a sealed resilient-walled capsule filled with a fluid having substantial rigidity against deformation under impact loads but ready deformity under the gradual application of a load tending to separate the ball stud and housing relative to each other.

3. In a ball joint comprising a hollow housing having a ball stud positioned therein for universal pivotal movement relative thereto, biasing means forcing said stud into intimate bearing contact with bearing surfaces on said housing, and sealed impact resisting means associated with said stud and said housing for preventing separation of said stud from said housing under impact loads, said impact resisting means comprising a sealed flexible-walled capsule containing a fluid having substantial rigidity under impact loads but fluidity under the gradual application of a load tending to separate the ball stud and housing relative to each other, said sealed means having means associated therewith for maintaining said sealed means in constant engagement with said ball stud and said housing.

4. In a ball joint comprising a housing having a segmental spherical bearing surface therein, and a ball stud positioned therein and having a segmental spherical bearing surface thereon for cooperation with said bearing surface on said housing, biasing means for maintaining said stud and housing bearing surfaces in cooperation with each other, an impact resisting means positioned between said housing and said ball stud for preventing separation of said bearing surfaces under impact loads, said impact resistant means comprising a sealed, resilient-walled capsule initially deformed from its free, unloaded, state and containing a fluid having the characteristic of substantial rigidity under sharp impact loads and fluidity under gradually applied loads.

5. An impact resisting capsule comprising a resilient fluid tight outer casing completely filled with a fluid having a characteristic of substantial rigidity under impact and deformability under gradually applied loads.

6. An impact load resisting capsule for use in ball joints, comprising, a substantially tubular resilient housing closed at both ends in a fluid tight seal, said housing being completely filled with a material having substantial rigidity under sharp impact but ready deformability under gradually applied loads.

7. An impact load resisting capsule for use in ball joints, comprising a substantially tubular resilient housing closed at both ends in a fluid tight seal, said housing being completely filled with a fluid having substantial rigidity under sharp impact but ready deformability under gradually applied loads, at least one of said ends comprising a metallic closure plate having its periphery secured in sealed relation to the end of said tube.

8. An impact load resisting capsule for use in ball joints, comprising a substantially tubular resilient housing closed at both ends in a fluid tight seal, said housing being completely filled with a material having substantial rigidity under sharp impact but ready deformability under gradually applied loads, and spring means positioned within said capsule and acting against both ends of said tube.

9. An impact load resisting capsule for use in ball joints, comprising a substantially tubular resilient housing closed at both ends in a fluid tight seal, said housing being completely filled with a fluid having substantial rigidity under sharp impact but ready deformability under gradually applied loads and resilient means tightly engaging the periphery of said tube and resiliently urging the walls thereof radially inwardly to resist movement of the ends of said tube toward each other.

References Cited in the file of this patent

UNITED STATES PATENTS

| Number | Name | Date |
|---|---|---|
| 43,316 | Lewis | Jan. 28, 1864 |
| 1,729,565 | Caretta | Sept. 24, 1929 |
| 1,928,526 | Fellabaum | Sept. 26, 1933 |
| 2,038,968 | Summers | Apr. 28, 1936 |
| 2,044,646 | Swennes et al. | June 16, 1936 |
| 2,397,464 | Booth | Apr. 2, 1946 |
| 2,443,201 | Sluyter | June 15, 1948 |
| 2,460,116 | Bazley | Jan. 25, 1949 |
| 2,499,346 | Alldredge | Mar. 7, 1950 |
| 2,533,928 | Graham | Dec. 12, 1950 |
| 2,537,629 | Brown | Jan. 9, 1951 |
| 2,539,186 | French | Jan. 23, 1951 |
| 2,570,853 | Pierce | Oct. 9, 1951 |
| 2,570,854 | Pierce | Oct. 9, 1951 |
| 2,668,049 | Taylor | Feb. 2, 1954 |
| 2,729,440 | Wales | Jan. 3, 1956 |
| 2,755,116 | Alldredge | July 17, 1956 |

FOREIGN PATENTS

| 616,971 | Germany | Aug. 9, 1935 |